United States Patent
Scheffler et al.

(10) Patent No.: US 6,306,032 B1
(45) Date of Patent: Oct. 23, 2001

(54) AIR-CONDITIONING SYSTEM FOR BELOW-DECK AREAS OF A PASSENGER AIRCRAFT

(75) Inventors: Hans-Joachim Scheffler, Hamburg; Michael Markwart, Halstenbak; Uwe Buchholz, Bliedersdorf, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/595,417

(22) Filed: Jun. 16, 2000

(30) Foreign Application Priority Data

Jun. 17, 1999 (DE) .............................. 199 27 606

(51) Int. Cl.7 ............................................ B64D 13/02
(52) U.S. Cl. ..................... 454/71; 244/129.2; 454/76
(58) Field of Search ................... 454/71, 72, 73, 454/74, 76, 77; 244/118.5, 129.2

(56) References Cited

U.S. PATENT DOCUMENTS

| 5,253,484 | * | 10/1993 | Corman et al. | 62/239 |
| 5,516,330 | | 5/1996 | Dechow et al. | . |
| 5,890,957 | | 4/1999 | Scherer et al. | . |
| 5,897,079 | * | 4/1999 | Specht et al. | 244/118.5 |
| 6,024,639 | * | 2/2000 | Scherer et al. | 454/77 |

FOREIGN PATENT DOCUMENTS 4335152   4/1995  (DE) .

* cited by examiner

*Primary Examiner*—Harold Joyce
*Assistant Examiner*—Derek S. Boles
(74) *Attorney, Agent, or Firm*—W. F. Fasse; W. G. Fasse

(57) ABSTRACT

An aircraft air-conditioning system provides ventilation, air-conditioning and fire protection for a below-deck stairwell and cargo hold that may be equipped with passenger sleeping compartment containers. An air mixing unit mixes fresh air and recycled air to supply mixed air through a first supply air main line (31) and a supply air unit (21) into the freight hold (4), and through a second supply air main line (32) into the stairwell (5). A trimming air unit (7A) provides hot bleed air from the aircraft engines into the mixed air supplied through the first and second supply air main lines (31, 32). An exhaust air line (11) extracts exhaust air from the freight hold (4), while an exhaust air supplemental line (15) extracts exhaust air from the stairwell (5), both of which are connected to an exhaust air main line with an exhaust air ventilator (16) that blows the exhaust air overboard. A bypass line (8) provides bypass air if needed for the demands of the ventilator (16). Regulating valves and non-return flap valves in the supply air line and in the exhaust air line regulate the flow of air and prevent back-flow. Temperature sensors are connected to a controller that regulates the temperature of the mixed supply air to achieve a comfortable temperature in the freight hold and in the stairwell. In the event of fire, the air valves are closed, to seal-off the freight hold (4) and prevent the spread of smoke into the stairwell or other ventilated areas.

19 Claims, 2 Drawing Sheets

AIR-CONDITIONING SYSTEM FOR BELOW-DECK AREAS OF A PASSENGER AIRCRAFT

This application is based on and claims the priority under 35 U.S.C. §119 of German Patent Application 199 27 606.4, filed on Jun. 17, 1999, the entire disclosure of which is incorporated herein by reference.

FIELD OF THE INVENTION

The invention relates to an arrangement or system for air-conditioning the underfloor or below-deck areas of a passenger aircraft, and particularly the freight compartments and/or other utilized areas under the main floor or deck of a passenger aircraft, while making rational and economic use of the available heat energy resources of the passenger aircraft. The invention further relates to such an arrangement that provides prophylactic measures of fire protection.

BACKGROUND INFORMATION

It is generally known in the art that various underfloor or below-deck areas of certain types of passenger aircraft can be used by passengers or crew members during at least portions of a flight. For example, it is known to outfit sleeping compartment containers within the freight or cargo hold of an aircraft, such that these sleeping compartment containers provide sleeping areas for individual passengers.

Various arrangements are also known for air-conditioning the several fuselage spaces including the freight or cargo compartment spaces of known aircraft types. In order to air-condition the above mentioned sleeping compartment containers to be suitable for occupancy by individual passengers, the conditioned air that is blown into these sleeping containers is heated to the required room temperature by an electrical heater, or alternatively cooled to the required temperature by a suitable cooling arrangement. The blown-in supply air is made up of various air components, which include portions of recycled air that has been withdrawn or extracted out of the passenger area, recycled i.e. prepared for reuse, and then recirculated, while additionally being cooled to a predetermined temperature using suitable cooling devices, for example an aircraft skin heat exchanger that uses the very low ambient environmental temperature prevailing outside of an aircraft flying at a typical cruise altitude. In this context, only temperature reductions within a rather strictly limited temperature range can be carried out during such cooling process. While the energy requirements for operating the aircraft air-conditioning packs are necessarily provided in any event, the above described known system of preparing and supplying air into the below-deck spaces requires at least an increased provision of electrical energy for operating the heaters that are needed for raising the temperature of the supplied air to higher levels. Also, the load on the existing air-conditioning packs is increased. As a result, the total energy consumption is increased, and makes greater demands on the limited on-board energy resources of the aircraft, which in turn also increases the costs of operating the aircraft.

A general reference disclosing means for carrying out the air-conditioning of cabin spaces of a passenger aircraft is German Patent Publication 43 35 152 C1 and corresponding U.S. Pat. No. 5,516,330 (Dechow et al.), which also suggest measures for air-conditioning the underfloor or below-deck spaces of the aircraft, such as the electrotechnical and electronics areas and the freight compartment areas. The disclosed ventilation or recirculation system relates primarily to the air-conditioning and ventilation of the passenger and cockpit areas of the aircraft, while the underfloor area of the aircraft is connected to the same system.

A person of ordinary skill in the art of aircraft construction will recognize from the above mentioned publications, that an air mixer unit provides prepared mixed air to the passenger and cockpit areas of a passenger aircraft. In this context, the mixed air is made up of partial quantities of fresh air and of recycled used exhaust air. The recycled air comprises used air that is exhausted out of the passenger and cockpit areas and thereafter prepared for recirculation in a so-called cabin recycling unit, comprising a particle and/or odor filter unit, a blower unit, a carbon dioxide adsorber unit, and a heat exchanger unit. The resulting recycled or recirculation air is delivered to the mixer unit together with externally tapped fresh air, which is extracted as hot bleed air from the engines of the aircraft for example. The prepared recycled air and the hot bleed air are mixed in the mixer unit, and then the resulting mixed air is blown from the mixer unit into the passenger and cockpit spaces.

In the above context, the heat exchanger unit integrated into the recycling unit receives externally extracted cool exterior air, by means of which the recirculated exhaust air is cooled to a suitable or comfortable tempered temperature level before it leaves the recycling unit to be provided as so-called prepared recirculation air to the mixer unit. It is also suggested, that the mixed air is additionally post-tempered by admixing a further regulated or branched-off partial quantity of bleed air that is tapped from the engines, before the resulting tempered mixed air is introduced into the air-conditioned spaces, namely the passenger and cockpit spaces. The introduction of this post-tempering bleed air is controlled through a so-called trimming air control valve unit. This unit, which comprises two trimming air regulation valves, separately regulates the supply of the above-mentioned trimming air, on the one hand for the passenger space, and on the other hand for the cockpit.

The underfloor spaces or areas of the aircraft located below the main deck are only indirectly affected by the disclosed system, because it is merely suggested that the ventilation of the above-mentioned electrotechnical and/or electronics spaces and the freight compartment spaces is to be achieved by the leakage of conditioned air escaping from the cockpit space into the just mentioned underfloor spaces through leakage openings. In other words, the fresh air, or generally the supplied air, reaches the electrotechnical and electronics spaces as well as the freight compartment spaces only indirectly by penetrating through leakage openings. The air then leaves the freight compartment or cargo hold space either through an exhaust valve or through a fuselage leak, so as to penetrate out of the pressurized fuselage to the ambient exterior environment. This contemplated arrangement primarily relates to the compensation of leaks in the pressurized fuselage, even though it further aims to maintain the air quality in the aircraft cabin by supplying fresh air. Thereby, the supply of fresh air is only necessary for replacing the quantity of air that escapes the fuselage through fuselage leaks. The above-mentioned prior art reference does not suggest appropriate measures for the improved air-conditioning of underfloor areas of an aircraft while making rational and economic use of the available energy resources. The prior art reference also provides no suggestion toward prophylactic fire protection measures.

SUMMARY OF THE INVENTION

In view of the above, it is an object of the invention to provide an arrangement for air-conditioning the underfloor or below-deck areas of a passenger aircraft, which are preferably divided into separate zones, and which may relate to the freight or cargo hold of an aircraft with or without sleeping compartment containers arranged therein, as well as a neighboring stairwell extending from the main deck down into the below-deck space. More particularly, it is an object of the invention to provide a system for air-conditioning and ventilating such below-deck spaces with metered quantities of supply air being provided and exhaust air being removed in a rational and economic manner, while utilizing the available energy resources of the aircraft. It is a further object of the invention to provide such an arrangement or system which achieves prophylactic measures of fire protection in such below-deck areas in order to prevent the area spreading of a fire to the extent possible, while at least ensuring that the exhaust air in the freight hold including the sleeping compartment containers, which air has been polluted by smoke or other toxic substances generated by the fire, is not exhausted out of these spaces and then recirculated to other air-conditioned spaces. The invention further aims to avoid or overcome the other disadvantages of the prior art, and to achieve additional advantages, as are apparent from the present specification.

The above objects have been achieved according to the invention in an arrangement or system for air-conditioning the underfloor or below-deck spaces of a passenger aircraft. The system comprises an air mixer unit that is provided with fresh air as well as partial quantities of recirculated air to prepare therefrom a supply of mixed air, and first and second supply air main lines connected to the air mixer unit to circulate tempered mixed air to the respective first and second below-deck spaces. The arrangement further comprises an exhaust air main line that is connected to the below-deck spaces and that serves to transfer the used exhaust air out of the below-deck spaces and to the exterior environment outside of the aircraft. The system further includes a trimming or balancing air supply line and first and second trimming air lines branched off from the trimming air supply line, as well as a bypass air line connected to the exhaust air main line, an exhaust air unit, and an exhaust air supplemental line.

The first trimming air line branching off from the trimming air supply line is connected to the first supply air main line that communicates from the air mixer unit to a supply air unit that in turn is connected to the first below-deck space and regulates the supply of mixed air being introduced into the first below-deck space. The second trimming air line that branches off from the trimming air supply line is connected to the second main supply air line, which in turn is connected to the second below-deck space so as to introduce mixed air thereinto.

The exhaust air unit that is connected to the first below-deck space and the exhaust air supplemental line that is connected to the second below-deck space, are each in turn connected to the exhaust air main line. The used exhaust air from both below-deck spaces is transferred respectively therethrough to the exhaust air main line. The bypass air line is also connected to the exhaust air main line, and provides additional bypass air, to the extent necessary, from other air reserves in the aircraft not associated with the exhaust air from the first and second below deck spaces.

The advantages of the invention as well as further detailed embodiment features are apparent from the rest of the present specification.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
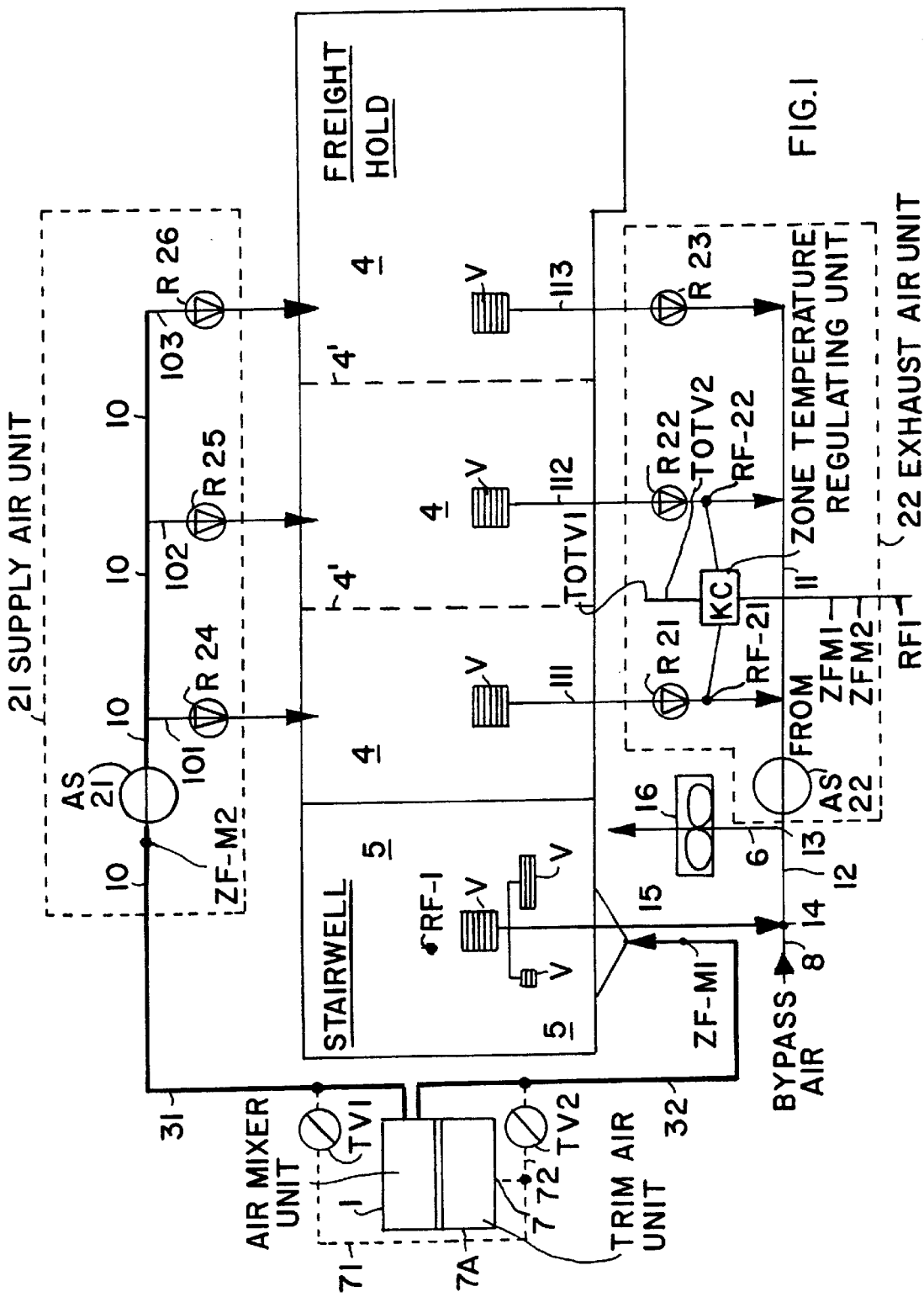
FIG. 1 is a schematic block diagram of an arrangement according to the invention for air-conditioning a freight hold and a stairwell of an aircraft.

The plan view of FIG. 1 schematically shows in block diagram fashion, the underfloor or below-deck area of a passenger aircraft, which includes two separated below-deck spaces, namely a first below-deck space 4 that is used as a freight or cargo hold, and a second below-deck space 5 that is used as a stairwell located directly adjacent to the freight hold 4. The stairwell 5 leads from the below-deck space to the main deck in the passenger cabin of the aircraft. Both of these below-deck spaces 4 and 5 are air-conditioned by an air-conditioning system or arrangement according to the invention.

In general, the present below-deck air-conditioning system comprises a plurality of different air handling units that are connected to each other by any conventionally known air connection lines, such as ducts, pipes, conduits, hoses, channels, etc. As an overview, the below-deck air-conditioning system primarily comprises an air mixer unit 1, a supply air unit 21, an exhaust air unit 22, an exhaust air ventilator or blower 16, and a trimming air unit 7A, interconnected in a particular manner by air connection lines, that may especially be embodied as air pipes or air ducts.

The air mixer unit 1 receives fresh air from outside of the aircraft in the form of bleed air that is tapped from the turbine engines of the aircraft, as well as a partial quantity of recirculated or recycled air that has been extracted as exhaust air from the passenger and/or cockpit areas of the aircraft and then recycled by filtering and the like in a conventional manner. The air mixer unit 1 then mixes the appropriate selected proportions of this fresh air and this recycled air, and then provides the resulting mixed air into two supply air main lines, namely a first supply air main line 31 and a second supply air main line 32.

A trimming unit 7A receives hot bleed air being tapped from the engine or engines, and provides a regulated quantity of this bleed air as trimming air into a trimming or balancing air supply line 7, which respectively branches into a first trimming air line 71 that connects into the first supply air main line 31, and a second trimming air line 72 that connects into the second supply air main line 32. The supply or introduction of the appropriate partial quantity of bleed air as trimming air into the respective affected supply air main line 31, 32 is separately or individually controlled through respective trimming air regulation valves, namely a first trimming air regulation valve TV1 interposed in the first trimming air line 71, and a second trimming air regulation valve TV2 interposed in the second trimming air line 72. In this context, the two respective trimming air regulation valves TV1 and TV2 can be regarded as parts or components included in the trimming air unit.

A supply air unit 21 is connected to the downstream end of the first supply air main line 31, and serves for the controlled supply or introduction of the tempered mixed air, which is provided from the air mixer unit 1 (and the trimming air unit 7A) through the first supply air main line 31, into the first below-deck space 4, namely the freight hold 4. The several subcomponents of the supply air unit 21 and their respective functions will be described in more detail below. On the other hand, the second supply air main line 32 serves for the controlled introduction or supply of the tempered mixed air, which is provided by the air mixer unit 1 (and the trimming air unit 7A), into the second below-deck space, namely the stairwell 5.

Assuming that the freight or cargo hold 4 is separated into a plurality of individual freight compartment zones, for example by corresponding separating walls 4' shown in dashed lines, so as to form three freight compartment zones for example, the present inventive arrangement provides for the separate air-conditioning and ventilation of each respective freight compartment zone through a respective individual supply air inlet line 101, 102, 103 which respectively supply appropriate quantities of mixed air. On the other hand, if the freight hold 4 is not physically divided into separate zones, e.g. by omitting the separating walls 4' shown in dashed lines in situations in which these are not necessary, then the air-conditioning and ventilation of the single larger below-deck space 4 can still be carried out in fictitious zones that are each respectively individually served by one of the supply air inlet lines 101, 102 and 103, which are arranged at predefined spacings relative to each other along a supply air line 10 that connects to and extends from the first supply air main line 31. The supply air line 10 as well as the supply air inlet lines 101, 102, and 103 are major components of the supply air unit 21 mentioned above. Typically, the respective supply air inlet lines 101, 102, and 103 are connected to a ceiling air supply inlet vent, from which the mixed air is blown into the respective associated zone of the freight hold 4.

In addition to the supply air line 10 and the respective supply air inlet lines 101, 102 and 103 as mentioned above, the supply air unit 21 connected to the first supply air main line 31 further includes a supply air regulating valve AS-21 interposed in the portion of the supply air line 10 ahead of or upstream of the first supply air inlet line 101, i.e. between the connection of the supply air line 10 to the first supply air main line 31 and the branching-off point of the first supply air inlet line 101. This supply air regulating valve AS-21 regulates the volume throughflow or flow rate of the total mixed air being provided from the first supply air main line 31 to the supply air line 10 of the supply air unit 21. Moreover, in the event of a fire or the like occurring in the freight hold 4, as detected by any conventional fire or smoke detection equipment, the supply air regulating valve AS-21 can be closed to shut off the supply of mixed air into the freight hold 4.

Furthermore, the supply air unit 21 includes respective individual non-return flap valves R24, R25 and R26 respectively interposed in the individual supply air inlet lines 101, 102 and 103, through which the divided or split partial streams of the mixed air that is supplied in a quantity-regulated manner through the supply air regulating valve AS-21 are blown through the respective individual supply air inlet lines 101, 102 and 103, while the respective non-return flap valves R24, R25 and R26 positively prevent a back-flow of air from the freight hold 4 back into the supply air line 10.

The supply of mixed air into the stairwell 5 can be achieved directly from the second supply air main line 32 leading from the air mixer unit 1 through appropriate inlet vents or the like into the stairwell 5. In other words, in the embodiment shown in FIG. 1, it is not necessary to interpose a second supply air unit between the second supply air main line 32 and the stairwell 5, although the use of such a supply air unit similar to the above described supply air unit 21 is also possible for introducing the mixed air from the second supply air main line 32 into the stairwell 5. In any event, the required quantity or flow rate of mixed air is supplied from the mixer unit 1, with appropriate trimming or balancing air provided by the trimming air unit 7A through the second trimming valve TV2, to ultimately be blown into the stairwell 5.

The removal or exhausting of used-up exhaust air from the freight hold 4 is carried out ultimately through an exhaust air main line 6, which typically exhausts or vents the exhaust air overboard outside of the aircraft, either directly through an overboard vent or into a bilge space or the like which in turn is vented overboard. Similarly, in order to remove the used exhaust air from the second below-deck space, namely the stairwell 5, an exhaust air supplemental line 15 leads from the stairwell 5 and is connected ultimately to the exhaust air main line 6, so that the exhaust air extracted out of the stairwell 5 can also be dumped overboard. This is achieved, for example, using a forced air flow or positive ventilation provided by an exhaust air ventilator or blower 16 interposed in the exhaust air main line 6.

In more detail, in order to remove the exhaust air from; the freight hold 4, an exhaust air unit 22 is connected and interposed between the freight hold 4 and the exhaust air main line 6. The exhaust air unit 22 includes an exhaust air line 11 that is connected at its downstream or output end through a first line branch 13 to the exhaust air main line 6. A plurality of individual exhaust air outlet lines 111, 112, and 113, for example matching the arrangement of the supply air inlet lines 101, 102, and 103 in the supply air unit 21, are connected at successive spacings apart from each other along the exhaust air line 11. The respective exhaust air outlet lines 111, 112 and 113 respectively communicate with the three zones of the freight hold 4 so that the used exhaust air passes from the zones of the freight hold 4 through suitable outlet vents into the exhaust air outlet lines 111, 112 and 113, and from those lines into the exhaust air line 11.

The portion of the exhaust air line 11 that does not have exhaust air outlet lines connected thereto, i.e. the portion of the exhaust air line 11 between the first line branch 13 and the closest exhaust air outlet line 111, has an exhaust air regulating valve AS-22 interposed therein. This exhaust air regulating valve AS-22 regulates the volume throughflow or flow rate of the below-deck exhaust air that is to be sucked out of the freight hold 4, in terms of the total quantity or flow rate of exhaust air to be removed. Furthermore, a respective non-return flap valve R21, R22 and R23 is respectively interposed in each exhaust air outlet line 111, 112 and 113 between the freight hold 4 and the respective connection to the exhaust air line 11, so as to prevent a back-flow of the exhaust air out of the exhaust air line 11 and back into the freight hold 4. Thus, the non-return flap valves R21, R22 and R23, cooperating with the non-return flap valves R24, R25 and R26, ensure a positive directed ventilation of the freight hold 4, regardless of different pressure conditions or imbalance of ventilation conditions among the separate zones of the freight hold 4, for example if divider or partition walls 4' are provided.

The above-mentioned exhaust air supplemental line 15 that transports exhaust air out of the stairwell 5 is connected via an exhaust air bridge line 12 to the exhaust air main line 6. More particularly, the exhaust air supplemental line 15 is connected to a second line branch 14 at one end of the exhaust air bridge line 12, of which the other end is connected to the above-mentioned first line branch 13 at the end of the exhaust air main line 6. A further bypass air line 8 is also connected to the second line branch 14 at respective ends of the exhaust air supplemental line 15 and the exhaust air bridge line 12. The detailed function of the bypass line 8 will be described below. As a further feature, it should be understood that any conventionally known type of air outlet vent V, such as floor vents, wall vents, and/or ceiling vents as schematically indicated in FIG. 1, are connected to the exhaust air supplemental line 15 and to the exhaust air outlet lines 111, 112 and 113, to provide for the outlet flow of the exhaust air out of the below-deck spaces 4 and 5 in the manner described above.

The extraction or sucking of the exhaust air out of the two below-deck spaces 4 and 5 is positively driven with an exhaust air ventilator or blower 16, which is interposed in or connected to the free end of the exhaust air main line 6, at a point opposite or downstream of the second line branch 14. The ventilator 16 sucks the below-deck exhaust air out of the two below-deck spaces 4 and 5 and transfers it into the bilge of the aircraft from which it may be vented overboard, for example. In a simplest configuration, the ventilator 16 is an unregulated exhaust ventilator, because the regulation of the exhaust air quantity can be achieved by the exhaust air regulating valve AS-22, for example. In such a manner the below-deck spaces 4 and 5 can be very effectively exhausted or ventilated to a controlled extent, while making rational use of the available thermal energy resources of the aircraft.

In this context, the unregulated ventilator achieves its intended suction effect when a sufficient air quantity is provided to it, which of course is influenced by the quantity of below-deck exhaust air that is to be exhausted or transferred through the ventilator from the two below-deck spaces 4 and 5. If the flow pressure of exhaust air supplied to the unregulated ventilator 16 is insufficient, i.e. if there is an insufficient flow of exhaust air from the below-deck spaces 4 and 5 provided through the exhaust air line 11 and the exhaust air supplemental line 15, then the insufficient quantity of air is made up by providing an additional amount of air through the bypass line 8, for example from other air reserves inside the aircraft, but not from the exhaust air of the below-deck spaces 4 and 5.

Of course, rather than using an unregulated ventilator 16, the desired suction effect can alternatively be achieved by an electrically driven and regulated exhaust air ventilator or blower. However, the use of such a regulated electrical blower or the like makes higher demands on the limited and strictly balanced on-board energy reserves of the aircraft, and therefore requires additional electrical energy to be produced, which is generally to be avoided for achieving an economical operation of a passenger aircraft.

Figure 2:
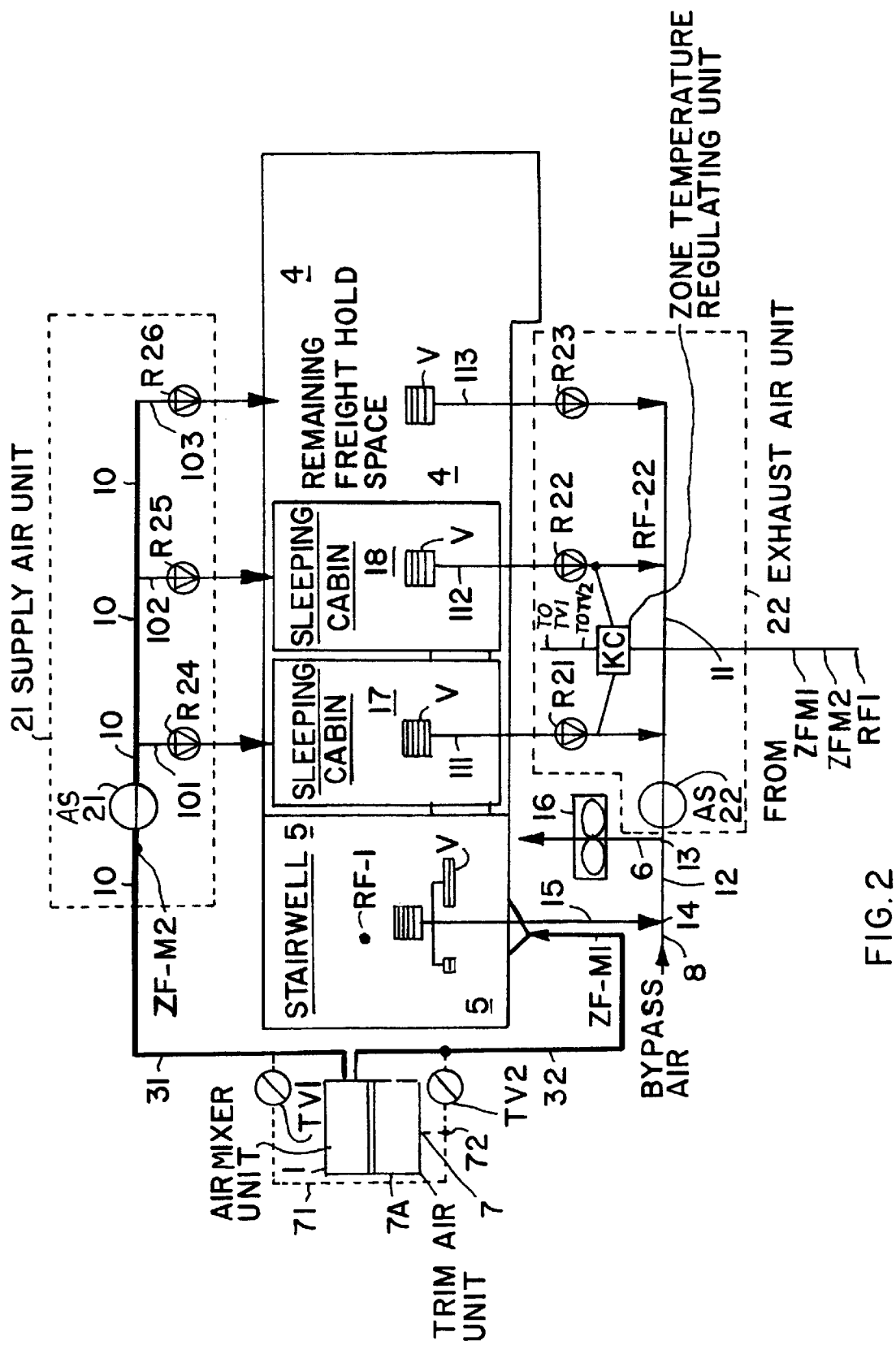
FIG. 2 is a schematic block diagram similar to FIG. 1, but showing the inventive arrangement provided for air-conditioning sleeping compartment containers installed in the aircraft freight hold.

In order to carry out the above described ventilation measures while simultaneously achieving a climate control or air-conditioning to achieve a comfortable temperature range in the two below-deck spaces 4 and 5, the following additional measures are provided. For this purpose, a first temperature sensor ZF-M2 is arranged within the duct cross-section of the first supply air main line 31 or the initial portion of the supply air line 10 connected to the supply air main line 31. This first temperature sensor ZF-M2 senses the temperature of the mixed air being provided into the first below-deck space or freight hold 4. Respective further temperature sensors such as second and third temperature sensors RF-21 and RF-22 are arranged within the duct cross-section of at least two of the exhaust air outlet lines 111, 112 and 113, for example in the lines 111 and 112 as shown in the embodiments of FIGS. 1 and 2, so as to determine the temperature of the below-deck exhaust air being extracted out of the belowdeck space 4. A fourth temperature sensor ZF-M1 is arranged within the duct cross-section of the second supply air main line 32, so as to determine the temperature of the mixed air being circulated into the second below-deck space or stairwell 5. Also, a room air sensor RF-1 is arranged within the second below-deck space or stairwell 5 in order to determine the temperature of the room air within the stairwell.

All four of the temperature sensors ZF-M1, ZF-M2, RF-21, and RF-22, and similarly the room air sensor RF-1, convert the sensitively detected air temperature values of the respective air quantity or air flow being measured into respective corresponding digital signals. The several sensors are connected by data lines, such as electrical conductors, optical signal conductors, or the like, to a zone regulation unit KC, so that the digital signals provided by the sensors are thereby provided to the zone regulating unit KC. This zone regulating unit KC individually compares the provided digital signals with prescribed rated or desired temperature values that are digitally stored in the zone regulating unit. Thereby, the zone regulating unit then determines, through a digital measured value comparison, any deviation of the actual measured temperatures from the prescribed desired temperature values, in order to responsively provide control signals to regulate the air temperature so as to minimize or eliminate this deviation.

In order to achieve this, two further data lines are respectively separately connected to the zone regulating unit on the one hand, and are further connected to the regulating components of the individual first and second trimming air regulating valves TV1 and TV2. Thus, if a deviation between the actual measured temperature value and the desired temperature value exists and is determined by the zone regulating unit KC, this unit converts the determined deviation into a digital control signal or actuating signal which is provided to the regulating components of the first and second trimming air regulating valve TV1 and TV2, which in turn vary the quantity or flow rate of bleed air that is provided as trimming air into the respective supply air main lines 31 and 32. In this context, it is understood that the bleed air is tapped from the propulsion engines or APU engine of the aircraft. Thereby, the varied quantity of hot trimming air adjusts the temperature of the mixed air that is provided through the first or second supply air main lines 31 or 32 into the respective below-deck spaces 4 or 5, so as to bring the temperature in these below-deck spaces 4 and 5 into the desired temperature range or set point. Thus, the mixed air is composed of several partial components including fresh air (for example provided as RAM air), recirculated partial quantities of recycled air, and hot trimming air, with the respective proportions of these components adjusted so as to achieve the desired temperature as well as the desired proportional content of fresh air.

The present inventive air-conditioning system further provides prophylactic measures of fire protection, in the event of an unexpected accidental break-out of a fire or the like in the first below-deck space or freight hold 4. In the event that a fire or the like is detected by conventional fire or smoke detection systems, the exhaust air regulating valve AS-22, as well as the supply air regulating valve AS-21 as mentioned above, are automatically closed, in order to seal-off the ventilation of the freight hold 4, and thereby compartmentalize or bulkhead and contain the evolution of fire and smoke into the freight hold 4 in a tightly sealed manner. In order to achieve this, a separate regulation or control, and if necessary an individual regulation and control, of the exhaust air regulating valve AS-22 is provided. Simultaneously, the non-return flap valves R21, R22 and R23 assist in the sealing and compartmentalization of the freight hold zones so that there will be no cross-communication and no exhaust ventilation of any amount of exhaust air that has been polluted with smoke, soot or other dangerous particles or emissions of a fire or the like. In this situation, when the exhaust air regulating valve AS-22 has been closed, the above described unregulated exhaust air ventilator 16 will not receive a sufficient quantity of exhaust air through the exhaust air line 11 for satisfying the desired suction effect, so that especially in this case an additional air quantity as necessary can be provided through the bypass air line 8 in order to compensate for the stopped flow from the exhaust air line 11.

FIG. 2 generally corresponds to FIG. 1, and the embodiment of the inventive air-conditioning system disclosed therein is substantially the same as that described above in connection with FIG. 1, except that two sleeping compartment containers 17 and 18 have been installed in the first two zones of the freight hold 4. Generally, the arrangement and operation of the inventive system according to FIG. 2 corresponds exactly to that described above in connection with FIG. 1, with the further understanding that the sleeping compartment containers or sleeping cabins 17 and 18 may partially or completely fill respective zones of the freight hold 4 as described above. Note also that the third zone of the freight hold as described above remains vacant or empty of sleeping compartment containers. Even if each sleeping compartment container 17 and 18 is entirely separated from the others, it will still receive an individual positive ventilation and air-conditioning, through the supply air unit 21 and the exhaust air unit 22, which are individually divided into ventilation and air-conditioning zones as described above.

In the way of a summary, the operation of the above described inventive system is as follows. The inventive system provides for the air-conditioning of below-deck spaces of a passenger aircraft with appropriate prepared mixed air in a comfortable temperature range that is blown into the respective zones of the below-deck spaces, and then the used exhaust air is positively removed from the zones of the below-deck spaces. The mixed air is blown through a supply air unit 21, particularly through a regulating valve and shut-off valve AS-21 and several non-return flap valves R24, R25 and R26, into the zones of a freight hold that may optionally be equipped with sleeping compartment containers. The mixed supply air is blown into a stairwell from the second supply air main line.

The temperature of the blown-in supply air is measured by means of temperature sensors ZF-M1 for the stairwell and ZF-M2 for the freight hold, and these actual measured temperature values are compared to prescribed rated values or selected values that have been stored in the zone regulating unit KC. According to the prescribed protocol or regulations regarding the air-conditioning of spaces within a passenger aircraft, the air temperature of the mixed supply air is heated as necessary to provide the appropriate temperature within the respective below-deck spaces. The actual room temperature existing in the stairwell 5 is detected by a room air sensor RF-1 and the actual air temperature in the freight hold 4 or the sleeping compartment containers 17 and 18 is detected by two temperature sensors RF-21 and RF-22 arranged in the exhaust air ducts, whereby these two temperature values from the temperature sensors RF-21 and RF-22 are averaged in the zone regulating unit, for example.

The exhaust air of the respective individual zones of the freight hold 4 is sucked through air outlet vents and respective non-return flap valves R21, R22, and R23 by the suction effect of an unregulated exhaust air ventilator 16, which in turn blows the exhaust air into the bilge of the aircraft, from which it may be vented overboard from the aircraft fuselage. The sealed compartmentalization or bulkheading of the freight hold and/or the sleeping compartment containers arranged therein, in the event of a fire or the like, is achieved by closing the exhaust air main line 11 by means of the exhaust air regulating valve AS-22 as well as by the non-return flap valves R21, R22 and R23. This ensures that no smoke or other dangerous emissions that have polluted the exhaust air will flow into the stairwell 5 from the freight hold 4, insofar as the exhaust air ventilator 16 no longer develops any suction effect. In order to ensure the continued exhaust air suction process, the bypass air line 8 provides the necessary missing or make-up quantity of air as a result of which the exhaust air ventilator 16 may again develop and provide its suction effect.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger aircraft including a fuselage enclosing a fuselage interior space with a main deck floor therein, and with a passenger cabin above said main deck floor and respective first and second below-deck spaces below said main deck floor, a source of fresh external air, a source of hot pressurized air, and an air recycling system that is a source of recycled air in said aircraft, an air-conditioning system for air-conditioning said below-deck spaces in said passenger aircraft, said air-conditioning system comprising:

an air mixer unit that is connected to said source of fresh external air and to said source of recycled air, and is adapted to receive and mix said fresh external air and said recycled air to prepare mixed air;

a first supply air main line that is connected to and extends from said air mixer unit, and is adapted to receive a portion of said mixed air from said air mixer unit;

a supply air unit that is connected and communicates from said first supply air main line to said first below-deck space;

a second supply air main line that is connected to and extends from said air mixer unit, is adapted to receive a portion of said mixed air from said mixer unit, and is connected and communicates into said second below-deck space;

a trimming air supply unit that is connected to said source of hot pressurized air to provide trimming air;

a first trimming air line that is connected and communicates from said trimming air supply unit to said first supply air main line;

a second trimming air line that is connected and communicates from said trimming air supply unit to said second supply air main line;

an exhaust air main line that communicates overboard to an external environment outside of said aircraft;

an exhaust air unit that is connected and communicates from said first below-deck space to said exhaust air main line; and an exhaust air supplemental line that is connected and communicates from said second below-deck space to said exhaust air main line.

2. The air-conditioning system in the passenger aircraft according to claim 1, further comprising a common trimming air supply line that connects both said first and second trimming air lines in common to said trimming air supply unit, wherein said first and second trimming air lines branch off from said common trimming air supply line which is interposed between said trimming air supply unit and said first and second trimming air lines.

3. The air-conditioning system in the passenger aircraft according to claim 1, further comprising a bypass air line that is connected and communicates to said exhaust air main line.

4. The air-conditioning system in the passenger aircraft according to claim 3, wherein said exhaust air unit includes an exhaust air line that is connected and communicates into said exhaust air main line at a first line branch, and wherein said air-conditioning system further comprises an exhaust air bridge line of which one end is connected to said first line branch and of which another end forms a second line branch that is connected to said exhaust air supplemental line and to said bypass air line so that said exhaust air bridge line connects and communicates said exhaust air supplemental line and said bypass air line to said exhaust air main line.

5. The air-conditioning system in the passenger aircraft according to claim 3, further comprising an unregulated exhaust air ventilator interposed in said exhaust air main line, wherein said ventilator develops a suction effect when provided with a sufficient air flow through said exhaust air main line, wherein said bypass air line is connected to and communicates from said fuselage interior space not including said first and second below-deck spaces, and wherein said bypass air line provides bypass air from said fuselage interior space not including said first and second below-deck spaces to said exhaust air main line if a flow rate of air provided from said exhaust air unit and said exhaust air supplemental line is inadequate for operation of said unregulated exhaust air ventilator.

6. The air-conditioning system in the passenger aircraft according to claim 1, further comprising an exhaust air blower interposed in said exhaust air main line, wherein said fuselage further has a bilge space therein below said first and second below-deck spaces, wherein said bilge space is vented overboard to said external environment, and wherein said exhaust air main line is connected and communicates into said bilge space so as to ultimately communicate through said bilge space to said external environment.

7. The air-conditioning system in the passenger aircraft according to claim 1, further comprising first and second trimming air regulating valves that are respectively interposed in said first and second trimming air lines and are adapted respectively to regulate a flow of said trimming air in said trimming air lines.

8. The air-conditioning system in the passenger aircraft according to claim 1, wherein said supply air unit comprises:
- a supply air line that is connected to said first supply air main line;
- a plurality of supply air inlet lines that are each respectively connected to said supply air line at respective connection points spaced from each other successively along said supply air line, and that are each respectively connected to and communicate into said first below-deck space;
- a supply air regulating valve that is adapted to regulate an air flow therethrough and that is interposed in said supply air line at a location between said first supply air main line and one of said connection points that is closest to said first supply air main line among said connection points; and
- a plurality of non-return flap valves that are respectively individually interposed in said supply air inlet lines, and that are adapted to allow an air flow therethrough only in a direction from said supply air line toward said first below-deck space.

9. The air-conditioning system in the passenger aircraft according to claim 8, further comprising a first temperature sensor arranged in said first supply air main line or in said supply air line between said first supply air main line and said one of said connection points that is closest to said first supply air main line among said connection points.

10. The air-conditioning system in the passenger aircraft according to claim 1, wherein said exhaust air unit comprises:
- an exhaust air line that is connected to said exhaust air main line;
- a plurality of exhaust air outlet lines that are each respectively connected to said exhaust air line at respective connection points spaced from each other successively along said exhaust air line, and that are each respectively connected to and communicate from said first below-deck space;
- an exhaust air regulating valve that is adapted to regulate an air flow therethrough and that is interposed in said exhaust air line at a location between said exhaust air main line and one of said connection points that is closest to said exhaust air main line among said connection points; and
- a plurality of non-return flap valves that are respectively individually interposed in said exhaust air outlet lines, and that are adapted to allow an air flow therethrough only in a direction from said first below-deck space toward said exhaust air line.

11. The air-conditioning system in the passenger aircraft according to claim 10, further comprising at least two temperature sensors arranged respectively individually in at least two of said exhaust air outlet lines.

12. The air-conditioning system in the passenger aircraft according to claim 1, further comprising a temperature sensor arranged in said second supply air main line.

13. The air-conditioning system in the passenger aircraft according to claim 1, further comprising a room air temperature sensor arranged in said second below-deck space.

14. The air-conditioning system in the passenger aircraft according to claim 1, further comprising:
- a first temperature sensor arranged in said first supply air main line or in said supply air unit;
- a second temperature sensor arranged in said second supply air main line;
- a third temperature sensor arranged in said exhaust air unit;
- a fourth temperature sensor arranged in said exhaust air unit;
- a room air temperature sensor arranged in said second below-deck space;
- a zone temperature regulating unit including a memory and a comparator; and
- respective temperature signal conductors connecting said first temperature sensor, said second temperature sensor, said third temperature sensor, said fourth temperature sensor, and said room air temperature sensor to said zone temperature regulating unit;
- wherein said zone temperature regulating unit is adapted to store specified temperature values in said memory, and to compare actual measured temperature values received from said temperature sensors via said temperature signal conductors with said specified temperature values and determine deviation values of said actual measured temperature values relative to said specified temperature values.

15. The air-conditioning system in the passenger aircraft according to claim 14, further comprising a first trimming air regulating valve interposed in said first trimming air line, a second trimming air regulating valve interposed in said second trimming air line, and respective control signal conductors connecting said zone temperature regulating unit to said first and second trimming air regulating valves, wherein said zone temperature regulating unit is adapted to generate control signals dependent on and responsive to said deviation signals and to transmit said control signals via said control signal conductors to said first and second trimming air regulating valves so as to actuate said first and second trimming air regulating valves to regulate an amount of said trimming air introduced into said first and second supply air main lines.

16. The air-conditioning system in the passenger aircraft according to claim 14, wherein said temperature sensors are respective digital temperature sensors that provide digital temperature signals onto said temperature signal conductors, and wherein said zone temperature regulating unit is a fully digitally operating device.

17. The air-conditioning system in the passenger aircraft according to claim 1, wherein said first and second trimming air lines are adapted to introduce at least respective portions of said trimming air into said mixed air in said first and second supply air main lines so as to form temperature-regulated trimmed mixed air of said mixed air together with said trimming air.

18. The air-conditioning system in the passenger aircraft according to claim 1, wherein said first below-deck space is a freight hold space, and said second below-deck space is a stairwell.

19. The air-conditioning system in the passenger aircraft according to claim 18, wherein said aircraft further includes sleeping compartment containers arranged in said freight hold space, and wherein said supply air unit is connected to and communicates into said sleeping compartment containers in said freight hold space.

* * * * *